(12) United States Patent
Hall et al.

(10) Patent No.: US 7,108,070 B2
(45) Date of Patent: Sep. 19, 2006

(54) GAS-TO-LIQUIDS FACILITY FOR FIXED OFFSHORE HYDROCARBON PRODUCTION PLATFORMS

(75) Inventors: Ricky A. Hall, Houston, TX (US); Richard D. Yetman, Tomball, TX (US)

(73) Assignee: GTL Microsystems AG, Rigistrasse (CH)

( * ) Notice: Subject to any disclaimer, the term of this patent is extended or adjusted under 35 U.S.C. 154(b) by 267 days.

(21) Appl. No.: 10/627,495

(22) Filed: Jul. 25, 2003

(65) Prior Publication Data

US 2004/0134660 A1    Jul. 15, 2004

Related U.S. Application Data

(60) Provisional application No. 60/398,742, filed on Jul. 26, 2002.

(51) Int. Cl.
*E21B 43/017* (2006.01)
(52) U.S. Cl. .................. 166/357; 166/267; 166/75.12; 518/702
(58) Field of Classification Search ................ 166/352, 166/357, 367, 267, 75.12; 518/702, 703, 518/714, 715
See application file for complete search history.

(56) References Cited

U.S. PATENT DOCUMENTS

| 5,477,924 | A | 12/1995 | Pollack |
| 5,866,751 | A | 2/1999 | Womack, Jr. et al. |
| 5,929,125 | A * | 7/1999 | Crane et al. ................. 518/702 |
| 5,950,732 | A * | 9/1999 | Agee et al. .................. 166/354 |
| 6,211,255 | B1 | 4/2001 | Schanke et al. |
| 6,262,131 | B1 | 7/2001 | Arcuri et al. |
| 2002/0009407 | A1 | 1/2002 | Kourtakis et al. |
| 2002/0024038 | A1 | 2/2002 | Iijima et al. |
| 2002/0035036 | A1 | 3/2002 | Figueroa et al. |

FOREIGN PATENT DOCUMENTS

WO    WO 99/15483 A1    4/1999

* cited by examiner

*Primary Examiner*—Thomas A Beach
(74) *Attorney, Agent, or Firm*—Henry C. Query, Jr.

(57) ABSTRACT

A GTL facility for a fixed offshore hydrocarbon production platform which comprises a deck attached to a base that is secured to the sea floor. The GTL facility comprises a syngas reactor for converting natural gas into syngas and a liquids production unit for converting the syngas into a hydrocarbon liquid. Furthermore, at least one of the syngas reactor and the liquids production unit comprises a catalyst which is constructed using PI micro-reactor technology. As a result, the GTL unit is sufficiently small to be located on the deck of the platform.

6 Claims, 2 Drawing Sheets

GAS-TO-LIQUIDS FACILITY FOR FIXED OFFSHORE HYDROCARBON PRODUCTION PLATFORMS

The present application is based on U.S. Provisional Patent Application No. 60/398,742, which was filed on Jul. 26, 2002.

BACKGROUND OF THE INVENTION

The present invention relates to a method and apparatus for converting natural gas to liquid hydrocarbons for storage and transport. More specifically, the invention relates to such a method and apparatus which are especially suitable for fixed offshore hydrocarbon production platforms.

A large number of fixed offshore hydrocarbon production platforms are currently in operation, all of which produce various quantities of natural gas. At many such sites natural gas is produced in relatively small quantities as a byproduct to the production of oil. When the quantities of this "associated gas" are sufficiently large and the platform is sufficiently close to a gas transportation infrastructure, the gas can be transported to an off-site processing facility.

In the absence of a gas transportation infrastructure, the associated gas is typically disposed of using a variety of methods. One of these methods involves re-injecting the gas into the hydrocarbon formation via a gas injection module located on the platform. Another method entails burning, or flaring, the gas. However, these methods of disposing of the associated gas are wasteful and, in the case of flaring, environmentally unfriendly.

Also, a number of small to medium size gas fields exist which are currently considered "stranded". Stranded fields are those which are located too far from an existing gas transportation infrastructure to be economically feasible to produce.

As is readily apparent, unprocessed associated gas and stranded gas represent two considerable but untapped sources of hydrocarbons. These sources are not utilized because the transportation of the gas from remote fixed offshore platforms is presently uneconomical. However, the transportation of the gas would be more economically viable if it could first be converted into liquid hydrocarbons, because then it could be transported using the existing oil transportation infrastructure.

Gas-to-liquids ("GTL") technology is commonly employed to convert natural gas to liquid hydrocarbons. The most common GTL process is a two stage process in which the natural gas is first converted into a synthetic gas, or "syngas", and the syngas is then converted into liquid hydrocarbons using the Fisher-Tropsch process. The conversion of natural gas to syngas may be achieved by steam reforming, partial oxidation, or a combination of both. Steam reforming, which is an endothermic process that is performed in a catalytic reactor, typically produces syngas comprising a 3:1 ratio of hydrogen to carbon monoxide. In the Fisher-Tropsch process, which is also carried out in a catalytic reactor, the small hydrocarbon molecules are linked to form longer chain hydrocarbons that are primarily liquid at ambient temperature.

Although GTL technology has been in the public domain since the 1930's, current GTL technology is generally not considered economical at small scales, especially scales suitable for use on fixed offshore hydrocarbon production platforms. To date, reducing a GTL facility down to the size required to replace an existing gas processing facility and at the same time fit into the confined footprint available on a fixed offshore platform has not been feasible. Previously, any GTL facility which could fit into this limited space typically would not have sufficient processing capacity, that is, it could process only unfeasibly small quantities of natural gas into liquid hydrocarbons.

SUMMARY OF THE INVENTION

In accordance with the present invention, these and other disadvantages in the prior art are overcome by providing a GTL facility for a fixed offshore hydrocarbon production platform having a deck which is attached to a base that is secured to the sea floor. The GTL facility comprises a syngas reactor for converting natural gas into syngas and a liquids production unit for converting the syngas into a hydrocarbon liquid. Furthermore, at least one of the syngas reactor and the liquids production unit comprises a catalyst which is constructed using PI micro-reactor technology. As a result, the GTL unit is sufficiently small to be located on the deck of the platform.

In accordance with another embodiment of the invention, the GTL facility further comprises a gas pre-processing unit for converting the natural gas into a form which is suitable for processing by the syngas reactor. For example, the gas pre-processing unit may filter, desulpher and/or dehydrate the natural gas.

In accordance with yet another embodiment of the invention, the GTL facility also comprises a hydrocracker unit for converting the hydrocarbon liquid into at least one hydrocarbon fuel which may be used to power a device which is located on or near the platform.

The GTL facility of the present invention is small enough to be installed on new or existing fixed offshore hydrocarbon production platforms. In addition, the GTL unit can be installed either in series or in parallel with existing gas processing facilities, such as a gas injection module or a flare. Alternatively, the GTL facility can completely replace the existing gas injection module, the flare, or both.

Thus, the GTL facility of the present invention provides an economical and efficient means for recovering unprocessed associated gas and stranded gas. Since it is sufficiently small to be located on the fixed offshore hydrocarbon production platform, the GTL facility can convert this natural gas into a liquid form which can be readily stored or transported to an off-site processing facility using an existing oil distribution infrastructure. Furthermore, if desired the GTL facility can convert some or all of the natural gas into fuel, such as gasoline, which can be used immediately on or near the offshore platform.

These and other objects and advantages of the present invention will be made apparent from the following detailed description, with reference to the accompanying drawings.

DETAILED DESCRIPTION OF THE PREFERRED EMBODIMENTS

The GTL facility of the present invention incorporates Process Intensification ("PI") micro-reactor technology. PI micro-reactor technology involves significantly increasing the ratio of surface area to volume of a catalyst, thus enlarging the percentage of available reaction sites in a given volume of catalyst. Accordingly, PI micro-reactor technology has enabled the development of GTL facilities of dramatically smaller physical size, for example at least one order of magnitude smaller, than prior GTL units having the same capacity. A GTL facility which incorporates PI micro-reactor technology is described in U.S. patent application Ser. No. 10/627,495 filed on May 28, 2003, which is commonly owned herewith and is hereby incorporated herein by reference.

Figure 1:
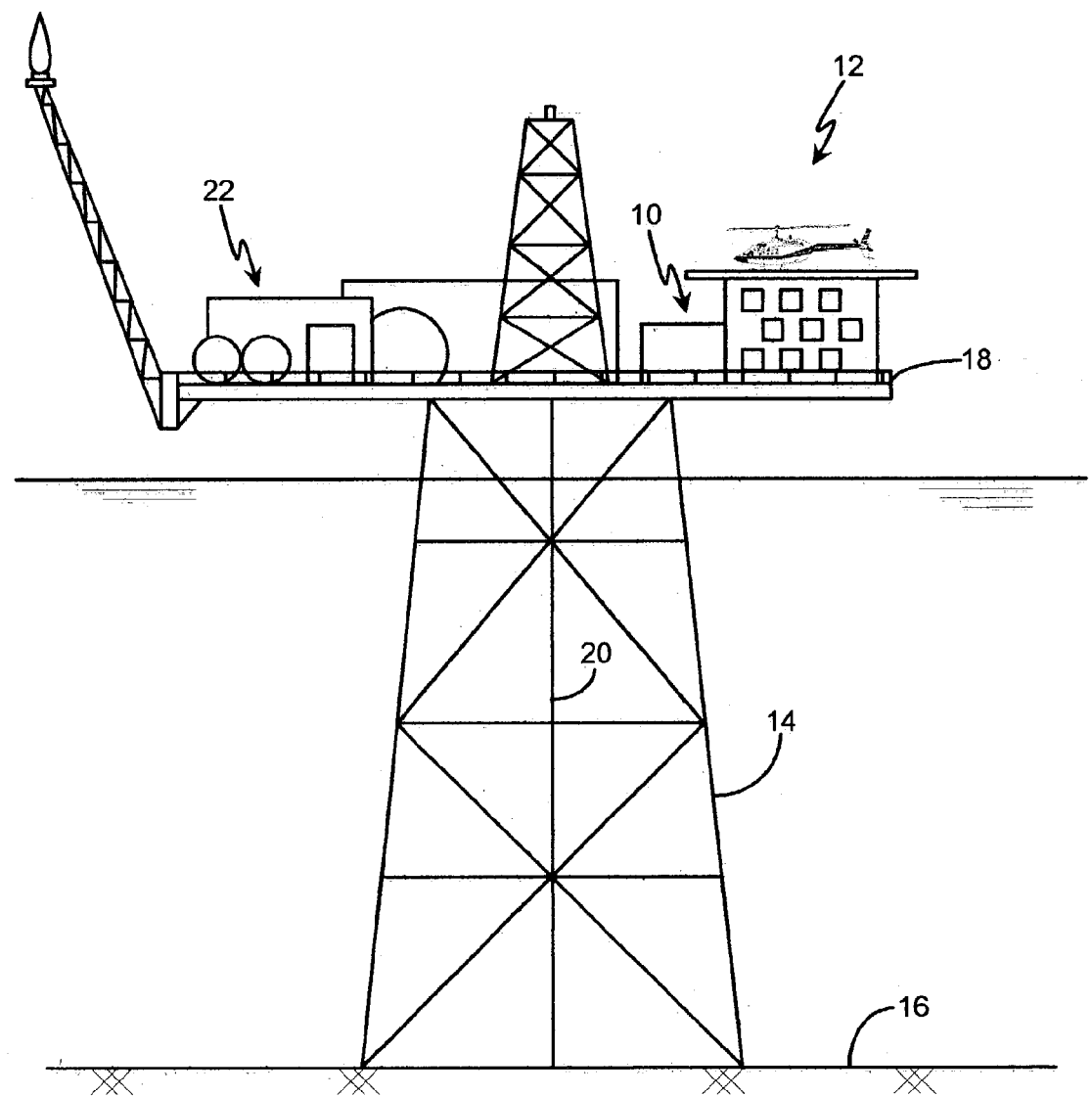
FIG. 1 is an elevation view of a typical offshore fixed oil and gas platform.

Referring to FIG. 1, the preferred embodiment of the present invention comprises a small scale, high throughput PI GTL conversion facility, generally 10, which is installed on a fixed offshore hydrocarbon production platform, such as the exemplary platform 12. The platform 12 comprises a base 14 which is secured to the sea floor 16 and a deck 18 which is connected to the top of the base above the surface of the water. The well fluids which are produced from one or more subsea wells or other sources (not shown) are communicated to the deck 18 via a number of riser pipes 2Q. These produced fluids are processed in various processing facilities 22 located on the deck 18, and the resulting oil and/or gas is then typically transported to an on-shore refinery via a pipeline, a shuttle tanker or other conventional means (not shown).

Figure 2:
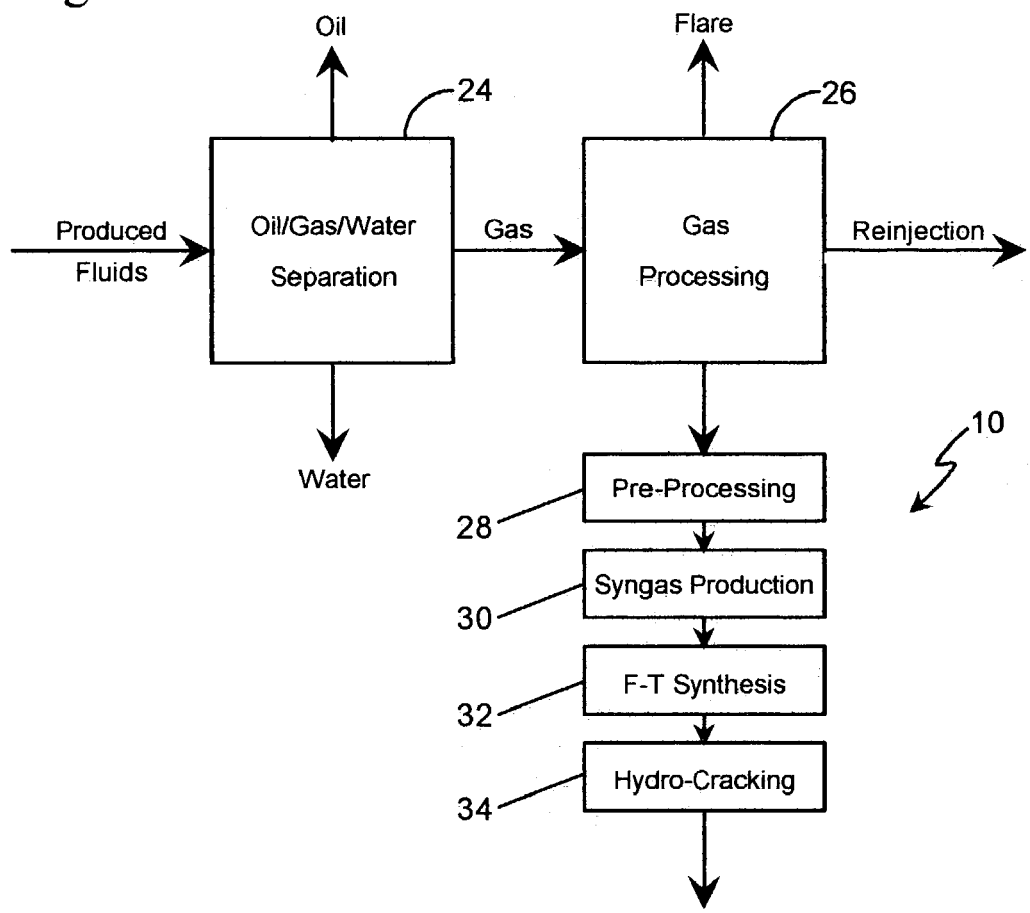
FIG. 2 is a flowchart outlining the processing of the produced fluids on an oil and gas platform utilizing the present invention.

The produced fluids usually include various quantities of oil, natural gas and water. As shown in FIG. 2, the produced fluids are therefore typically piped to a conventional separation unit 24, which separates these three main components using techniques that are well understood by those of ordinary skill in the art. After being separated, the water is typically disposed of, the oil is usually stored for subsequent transportation to an on-shore refinery, and the gas is conveyed to a gas processing facility 26.

In the prior art, the associated gas produced with the oil was either flared or re-injected into the formation via a gas injection module. In accordance with the present invention, however, this gas is converted into stable hydrocarbon liquids using the PI GTL facility 10.

The PI GTL facility 10 preferably comprises four basic components: a gas pre-processing unit 28; a syngas reactor 30; a liquids production unit 32; and a hydrocracker unit 34. It should be understood that, depending on the specific requirements of the gas processing facilities of the fixed offshore hydrocarbon production platform, one or more of these components may be eliminated from the present invention.

In the gas pre-processing unit 28, natural gas from the separation unit 24 is conditioned for input into the syngas reactor 32. The gas pre-processing unit 28 thus receives natural gas with potentially wide ranging input properties and conditions it so that it has characteristics which are uniform and suitable for the syngas reactor 30. In this pre-processing step, the natural gas may undergo, among other operations, filtering, desulphering, dehydrating, liquid propane gas ("LPG") separation, pressure regulation and flow control. The details of these processes are well understood by those of ordinary skill in the art and will therefore not be described in more detail herein. Upon exiting the gas pre-processing unit 28, the conditioned natural gas is comprised primarily of methane.

This conditioned natural gas is then piped to the syngas reactor 30, where it is converted into a syngas mixture comprising a 3:1 ratio of hydrogen to carbon monoxide, or any other gas mixture that is required by the specific GTL process being employed. A suitable process for converting the natural gas into syngas is the steam reforming process in which, as explained more fully in U.S. patent application Ser. No. 10/627,495, the natural gas is mixed with steam and then reacted with a catalyst. The syngas reaction is endothermic, and the heat required to drive the reaction can be supplied by a variety of sources, such as combusting a portion of the natural gas. In a preferred embodiment of the invention, the reaction heat is generated via a catalytic combustion of methane with hydrogen. The hydrogen for this reaction may be recycled from the residual, or "tail", gas produced in the liquids production unit 32.

The syngas reactor 30 ideally comprises a number of catalysts which are constructed using PI micro-reactor technology. For example, each such catalyst may comprise a reticulated ceramic foam catalyst containing one or more metal oxides of chromium, cobalt, nickel or the like. An example of this type of catalyst is described in U.S. Patent Application Publication No. 2002/0009407 A1, which is hereby incorporated herein by reference.

In the liquids production unit 32, the syngas or other output gas mixture from the syngas reactor 30 is converted into a mixture of higher chain hydrocarbon molecules, preferably $C_5+$, which are primarily liquid at ambient temperature. Ideally, this conversion is accomplished using the Fischer-Tropsch method, but other polymerization methods may also be used.

In a preferred embodiment of the invention, the liquids production unit 32 comprises a number of catalysts which are constructed using PI micro-reactor technology. As described in U.S. Pat. No. 6,211,255, which is hereby incorporated herein by reference, such a catalyst may comprise a monolithic catalyst having a solid body through which a plurality of discrete and continuous channels extend. In addition, the walls of the channels consist of or contain a catalyst material. In use, the synthesis gas is introduced into one end of the channels, the gas is synthesized as it passes through the channels, and the liquid product is removed from the opposite end of the channels.

The monolithic catalyst may comprise a substrate which is formed, e.g., by extrusion. In one embodiment, the monolithic catalyst comprises an inactive substrate with a relatively low specific surface area, a relatively high specific surface area catalyst support which is deposited on the walls of the channels using known techniques, and a catalyst material which is deposited on the walls of the channels, preferably simultaneously with the catalyst support material, again using known techniques. In another embodiment, the monolithic catalyst comprises an inactive substrate having a relatively high specific surface area, and a catalyst material which is deposited on the walls of the channels using known techniques. In yet another embodiment, the monolithic catalyst may comprise an extrusion of a relatively high specific surface area material which incorporates the catalyst material. Alternatively, the monolith may be formed directly from the catalyst material.

The relatively low surface area substrate materials may comprise, for example, a ceramic or a metal. The relatively high surface area substrate materials may comprise, for example, gamma-$Al_2O_3$, $SiO_2$, $TiO_2$ or a zeolite. The catalyst material may comprise, for example, Co, Fe, Cr, Al, Yt, Ru or Ni. The catalyst material may also include a promoter, such as Re, Pt, Ir, Rh, Pd or Ru.

The monolithic catalysts preferably has an open area or void fraction of between about 50% and 90%, and more preferably between about 60% and 80%, for example about 70%. In addition, the cell density of the monolithic catalyst is oreferably in the range of about 100 cells/in$^2$ to 1000 cells/in$^2$, more preferably about 200 cells/in$^2$ to 600 cells/in$^2$, and most preferably about 300 cells/in$^2$ to 500 cells/in$^2$. Furthermore, the wall thickness of the monolithic catalyst is preferably between about 0.05 mm and 0.40 mm, and more preferably between about 0.10 mm and 0.30 mm, for example 0.15 mm. Also, the monolithic catalyst may have a length in the centimeters to meters range, depending on the application.

When the liquids production unit 32 is operated in the Taylor flow regime, the narrow channels of the monolithic catalyst will promote almost perfect plug flow and significantly reduce or eliminate back mixing. Thus, since chemical reactions characterized by a positive order dependence on reactant concentrations are most efficiently carried out in plug-flow, the volume of monolithic catalyst required, and thus the size of the liquids production unit 32, will be smaller than in catalytic reactors which operate in mixed flow.

In one embodiment of the invention the monolith may comprise a crossflow design, wherein the gases travel through one series of channels and a cooling medium travels through a second series of transverse channels which alternate vertically with the gas channels.

The hydrocarbon liquids produced in the liquids production unit 32 can be stored on the platform 12 or transported immediately to an off-site facility for further processing. Alternatively, and in accordance with another feature of the present invention, the liquids can be input to the hydrocracker unit 34.

In the hydrocracker unit 34, the stable hydrocarbon liquids from the liquids production unit 32 are converted into hydrocarbon fuels, such as diesel, gasoline or any other desired fuel. The techniques used to effect such conversions are readily understood by those of ordinary skill in the art. As a result of the conversion of the hydrocarbon liquids into fuels, the fuels may be used immediately on or near the platform 12, or transported to an off-site facility.

Figure 3:
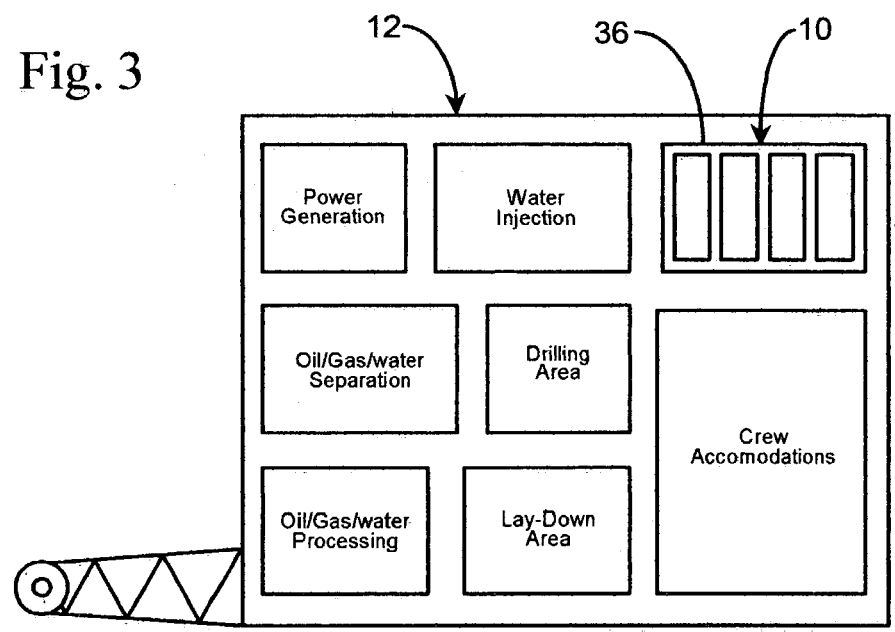
FIG. 3 is a schematic representation of a typical deck layout for an offshore fixed oil and gas platform utilizing the present invention.

Referring to FIG. 3, the PI GTL facility 10 may be located in an area of the platform 12 designated by the number 36. On a typical fixed platform, area 36 would normally be occupied by a gas injection module. In the preferred embodiment of the invention, the gas injection module and/or the flare are completely replaced by the PI GTL facility 10 in a retrofit operation. Therefore, the PI GTL facility 10 ideally must be able to fit into the existing area 36 and must have the capacity to process the same volume of gas as the gas injection module and/ore the flare. Alternatively, the PI GTL facility 10 could be incorporated into a new fixed platform design.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

We claim:

1. In combination with a fixed offshore hydrocarbon production platform which comprises a deck attached to a base that is secured to the sea floor, the improvement comprising a GTL facility for converting natural gas into a hydrocarbon liquid which comprises:
    a syngas reactor for converting the natural gas into syngas; and
    a liquids production unit for converting the syngas into the hydrocarbon liquid;
    wherein at least one of the syngas reactor and the liquids production unit comprises a monolithic catalyst which includes a solid body, a plurality of discrete channels which extend through the body and comprise walls, and a catalytic material which is deposited on the walls;
    wherein the monolithic catalyst camorises a cell density of between about 100 cells/in$^2$ and about 1000 cells/in$^2$;
    wherein the GTL unit is sufficiently small to be located on the deck of the platform; and
    wherein the gases flowing through the syngas reactor, or the gases and liquids flowing through the liquids production unit, flow through the channels in a flow regime which substantially eliminates back mixing.

2. A GTL facility for a fixed offshore hydrocarbon production platform which comprises a deck attached to a base that is secured to the sea floor, the GTL facility comprising:
    a syngas reactor for converting natural gas from a subsea well into syngas; and
    a liquids production unit for converting the syngas into a hydrocarbon liquid;
    wherein at least one of the syngas reactor and the liquids production unit comprises a monolithic catalyst which includes a solid body, a plurality of discrete channels which extend through the body and comprise walls, and a catalytic material which is deposited on the walls; and
    wherein the monolithic catalyst comprises a cell density of between about 100 cells/in$^2$ and about 1000 cells/in$^2$;
    wherein the GTL unit is sufficiently small to be located on the deck of the platform; and
    wherein the gases flowing through the syngas reactor, or the gases and liquids flowing through the liquids production unit, flow through the channels in a flow regime which substantially eliminates back mixing.

3. A GTL facility for a fixed offshore hydrocarbon production platform which comprises a deck attached to a base that is secured to the sea floor, the GTL facility comprising:
    a syngas reactor for converting natural gas from a subsea well into syngas; and
    a liquids production unit for converting the syngas into a hydrocarbon liquid;
    wherein at least one of the syngas reactor and the liquids production unit comprises a monolithic catalyst which includes a solid body, a plurality of discrete channels which extend through the body and comprise walls, and a catalytic material which is deposited on the walls;
    wherein the monolithic catalyst comprises a cell density of between about 100 cells/in$^2$ and about 1000 cells/in$^2$;
    wherein the GTL unit is sufficiently small to be located on the deck of the platform; and
    wherein the liquids production unit produces hydrogen which is used to generate heat for the conversion of natural gas into syngas in the syngas reactor.

4. The combination of claim 1, wherein the monolithic catalyst comprises a crossflow design defining a series of first channels for the gases to flow through and a series of transverse second channels for a cooling medium to flow through, and wherein the second channels alternate vertically with the first channels.

5. The combination of claim 2, wherein the monolithic catalyst comprises a crossflow design defining a series of first channels for the gases to flow through and a series of transverse second channels for a cooling medium to flow through, and wherein the second channels alternate vertically with the first channels.

6. The combination of claim 3, wherein the monolithic catalyst comprises a crossflow design defining a series of first channels for the gases to flow through and a series of transverse second channels for a cooling medium to flow through, and wherein the second channels alternate vertically with the first channels.

\* \* \* \* \*